(12) United States Patent
Jimenez

(10) Patent No.: US 7,735,875 B2
(45) Date of Patent: Jun. 15, 2010

(54) DEVICE AND METHOD FOR MAKING AND USING A PIPE COUPLING DEVICE

(76) Inventor: Andrew Jimenez, 9001 Mediterranean Dr., Huntington Beach, CA (US) 92646

( * ) Notice: Subject to any disclaimer, the term of this patent is extended or adjusted under 35 U.S.C. 154(b) by 366 days.

(21) Appl. No.: 11/429,779

(22) Filed: May 8, 2006

(65) Prior Publication Data

US 2007/0257488 A1 Nov. 8, 2007

Related U.S. Application Data

(60) Provisional application No. 60/679,186, filed on May 9, 2005.

(51) Int. Cl.
*F16L 21/06* (2006.01)
*F16L 21/08* (2006.01)

(52) U.S. Cl. .................. 285/90; 285/373; 285/404; 285/419

(58) Field of Classification Search .......... 285/404, 285/90, 302, 417, 373, 369, 419; 29/525.02, 29/253, 243.55, 237, 238, 270; 269/53, 95, 269/309, 900
See application file for complete search history.

(56) References Cited

U.S. PATENT DOCUMENTS

| 250,698 | A | * | 12/1881 | Wilson | ................. 285/417 |
|---|---|---|---|---|---|
| 494,996 | A | | 4/1893 | Dwelle | |
| 520,952 | A | | 6/1894 | Cox | |
| 623,416 | A | | 4/1899 | McCrory | |
| 1,978,195 | A | | 10/1934 | Hass | |
| 2,210,340 | A | * | 8/1940 | Reinhardt | ................. 285/384 |
| 2,472,307 | A | | 6/1949 | Nagel | |
| 2,739,018 | A | * | 3/1956 | Collett | ................. 175/325.5 |
| 3,771,820 | A | * | 11/1973 | Hoss et al. | ................. 285/373 |
| 3,905,623 | A | | 9/1975 | Cassel | |
| 4,257,628 | A | * | 3/1981 | Petersen | ................. 285/3 |
| 4,281,856 | A | * | 8/1981 | Litman et al. | ................. 285/15 |
| 4,611,839 | A | * | 9/1986 | Rung et al. | ................. 285/367 |
| 5,098,134 | A | * | 3/1992 | Monckton | ................. 285/38 |
| 5,160,175 | A | * | 11/1992 | Yang | ................. 285/104 |
| 5,823,581 | A | * | 10/1998 | Coppolo | ................. 285/373 |
| 6,170,891 | B1 | * | 1/2001 | Mercado et al. | ................. 285/419 |
| 6,557,908 | B2 | | 5/2003 | Houtschilt | |
| 7,410,192 | B2 | * | 8/2008 | Ignaczak et al. | ................. 285/373 |

OTHER PUBLICATIONS

Computer numerical control (CNC) (in Computer-aided engineering). (2001). In Dictionary of Engineering Terms, Butterworth-Heinemann. Retrieved Jun. 19, 2008, from http://www.credoreference.com/entry/759190.*

* cited by examiner

*Primary Examiner*—James M Hewitt
(74) *Attorney, Agent, or Firm*—Robert Z. Evora

(57) ABSTRACT

A pipe coupling device that secures a first pipe to a second pipe. The pipe coupling device includes a collet disposed within a collar having a fastening mechanism. The collet includes a first collet portion that interlocks with a second collet portion to form a seal that fastens the first pipe securely to the second pipe.

16 Claims, 12 Drawing Sheets

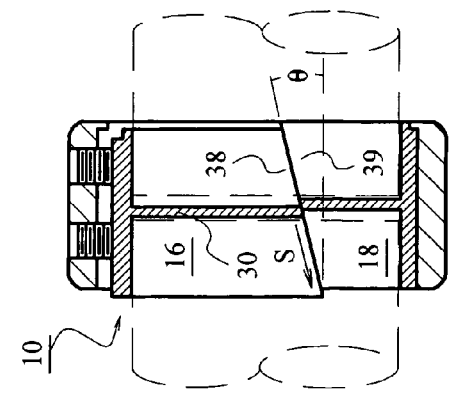
FIG. 6a STAGE 1
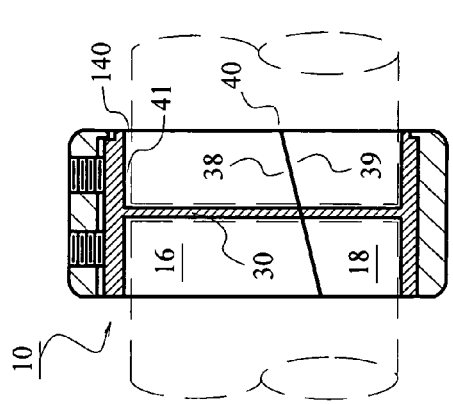
FIG. 6b STAGE 2
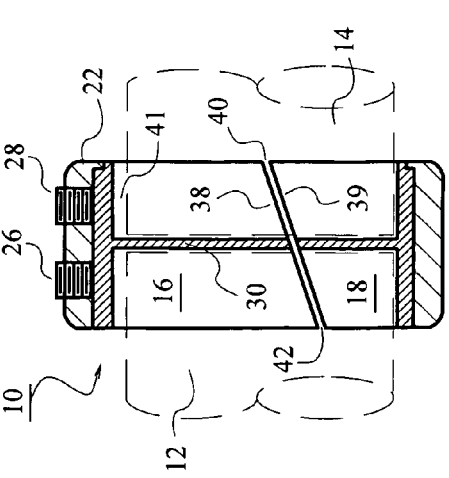
FIG. 6c STAGE 3
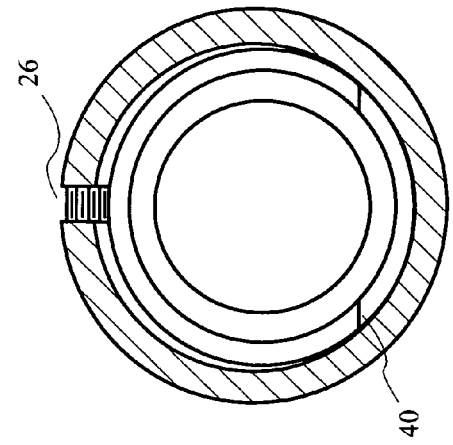
FIG. 7a
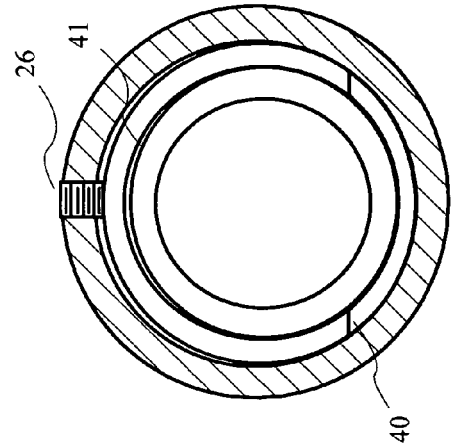
FIG. 7b
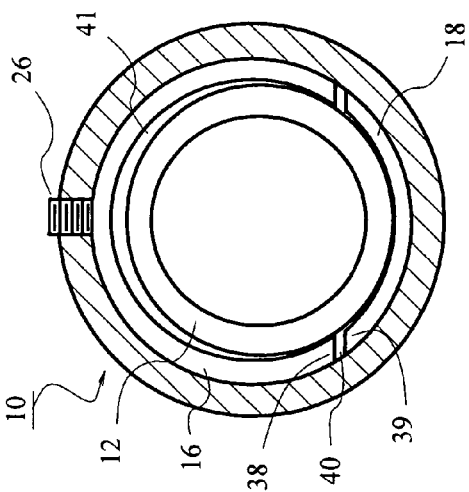
FIG. 7c

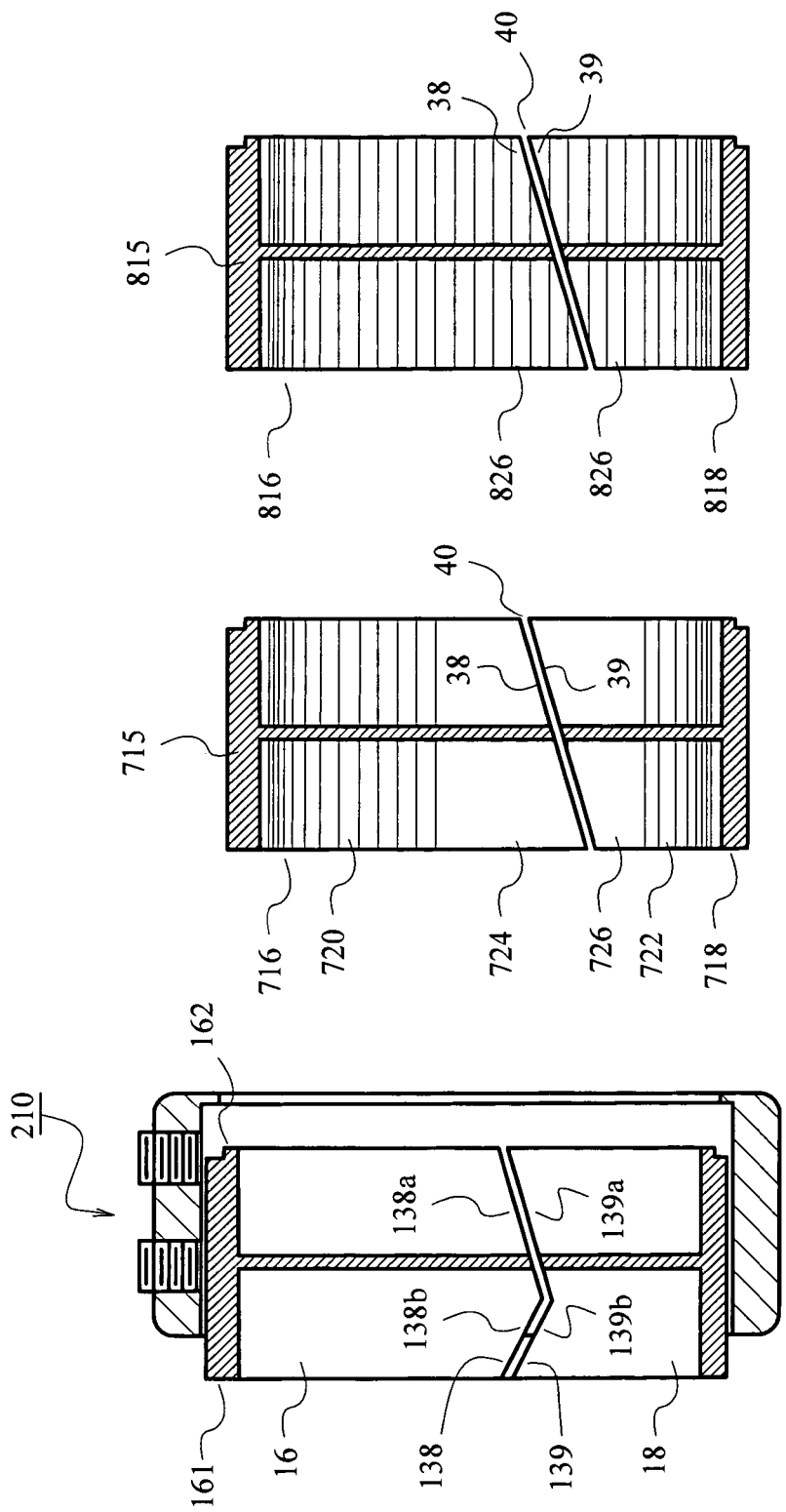

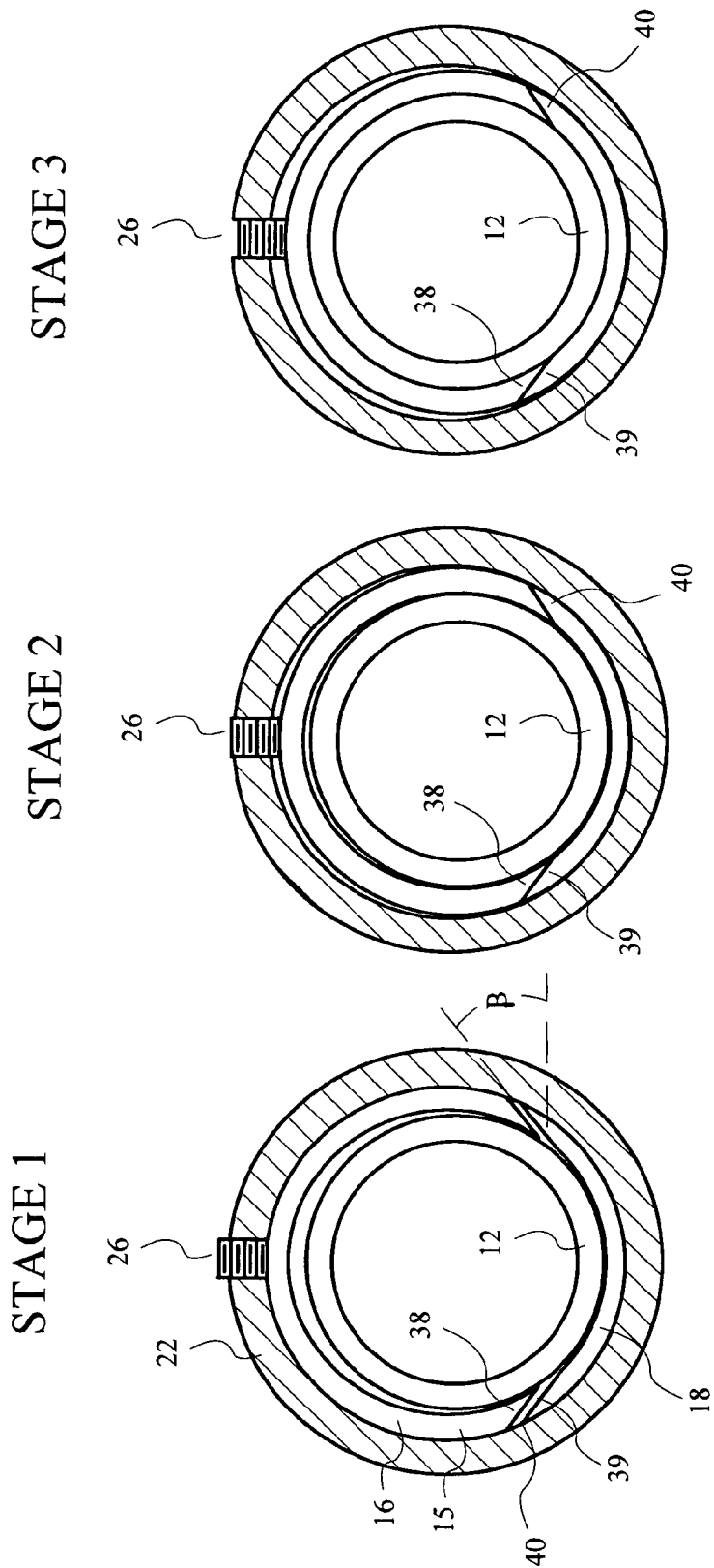

1

DEVICE AND METHOD FOR MAKING AND USING A PIPE COUPLING DEVICE

CROSS REFERENCE TO RELATED APPLICATION

This application is a Non-Provisional Application which claims the benefit of the filing date of U.S. Provisional Application Ser. No. 60/679,186, entitled "360 DEGREE ANNULATED SELF SEATING EXHAUST COLLET" filed May 9, 2005, the entirety of which is incorporated herein by reference.

BACKGROUND OF THE INVENTION

1. Field of the Invention

The present invention relates in general to a pipe coupling device that secures a first pipe to a second pipe, and in particular to providing an evenly distributed circumferential fastening force to seal and secure the two pipes to each other.

2. Description of the Related Art

Numerous pipe coupling devices are currently available on the market today. This art has shown that many of the commercially available pipe coupling devices are devised from a plethora of various coupling mechanisms, including using straps to brace two pipes adjacent to each other.

The disadvantage with these conventional pipe coupling devices is that the pipes being linked together are oftentimes deformed as a consequence of the non-uniform clamping force applied by conventional devices. Thus, it was not always possible to reuse these coupling devices and/or the pipes that were being joined together. Attempts have been made in the past to effectively fasten two pipes together without causing deformation to the pipes, however, there has been little success. Furthermore, the conventional pipe coupling devices fail to secure the two pipes in a manner in which a securing force is evenly distributed circumferentially onto the pipes.

SUMMARY OF THE INVENTION

An objective of the present invention is to provide a self seating collet which is adapted to minimize disfigurement of two pipes being joined together.

Another object of this invention is to provide an easy to use modular pine coupling device that is simple and quick to assemble and disassemble.

An object of the present invention is to provide a pipe coupling device that secures a first pipe to a second pipe. The pipe coupling device includes a collar including a fastening mechanism and a collet. The collet further includes a first collet portion that mates with a second collet portion at a separation gap angled transverse within the collar.

Yet another object of the present invention is to provide a method for securing a first pipe to a second pipe within a pipe coupling device. The method includes applying at least one point force through a collar onto a first collet portion. The point force is converted into an evenly distributed circumferential radial force that is applied to each of the pipes.

The first collet portion and the second collet portion include a joint which provides alignment of the first pipe and second pipes relative to each other. In one embodiment, the alignment may be telescopic and in another, the alignment may be an abutment alignment which can allow the first pipe and second pipe to substantially butt up adjacent to each other.

Another aspect of this invention is to implement a computer readable storage medium including a computer readable program code embodied on the computer readable storage medium. The computer readable program code is usable to program a computer to create a pipe coupling device. The implementation includes machining a collar in accordance with parameters specified by the program code. From a collet blank, machining a first semicircular collet portion that interlocks with a second semicircular collet portion to form a circular fastening device that secures the first pipe to the second pipe within the collar in accordance with parameters specified by the program code.

Alternatively, this invention is adapted to provide an elbow pipe coupling device capable of connect two pipes at an angle.

Unlike other conventional clamps developed for vehicle exhaust systems, this invention is not invasive and/or mechanically intrusive to the pipes joined together. Accordingly, improved longevity and ease of interchangeability is one of the benefits of this invention. Furthermore, superior sealing surface effects are attained from this invention.

According to this invention, the amount of force delivered by the clamp is high, yet, the amount of torque needed to tighten the first collet portion and the second collet portion to the pipes is low. Therefore, the risk of personal injury is reduced.

This concept is modular and interchangeability is an advantage. A sub-component in a linkage system of numerous pipes of varying sizes may be efficiently exchanged with ease in accordance with this invention with no affect to the remaining sub-components in the linkage system. Accordingly, different pipe sizes that need to be coupled to each other can be easily accommodated.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein:

FIGS. 6a, 6b and 6c illustrate an axial cross-section view of the first embodiment of the pipe coupling device in operation according to this invention.

FIGS. 7a, 7b and 7c illustrate a concentric cross-section view of the first embodiment of the pipe coupling device in operation according to this invention.

FIG. 16 is another exemplary cross-section view of another interlocking arrangement for a first collet portion and the second collet portion according to this invention.

FIGS. 17a, 17b and 17c illustrates various cross-sectional views for an interlocking arrangement in operation at a predetermined angle for a first collet portion and the second collet portion according to this invention.

FIGS. 18a and 18b illustrates splined pipe coupling devices in accordance with this invention.

DETAILED DESCRIPTION OF EXEMPLARY EMBODIMENTS

Particular embodiments of the present invention will now be described in greater detail with reference to the figures.

This invention overcomes the conventional problems described above by providing a pipe coupling device that evenly distributes a circumferential fastening force to secure two pipes to each other in a manner that permits a user to quickly and easily assemble and disassemble a pipe joint.

Figure 1:
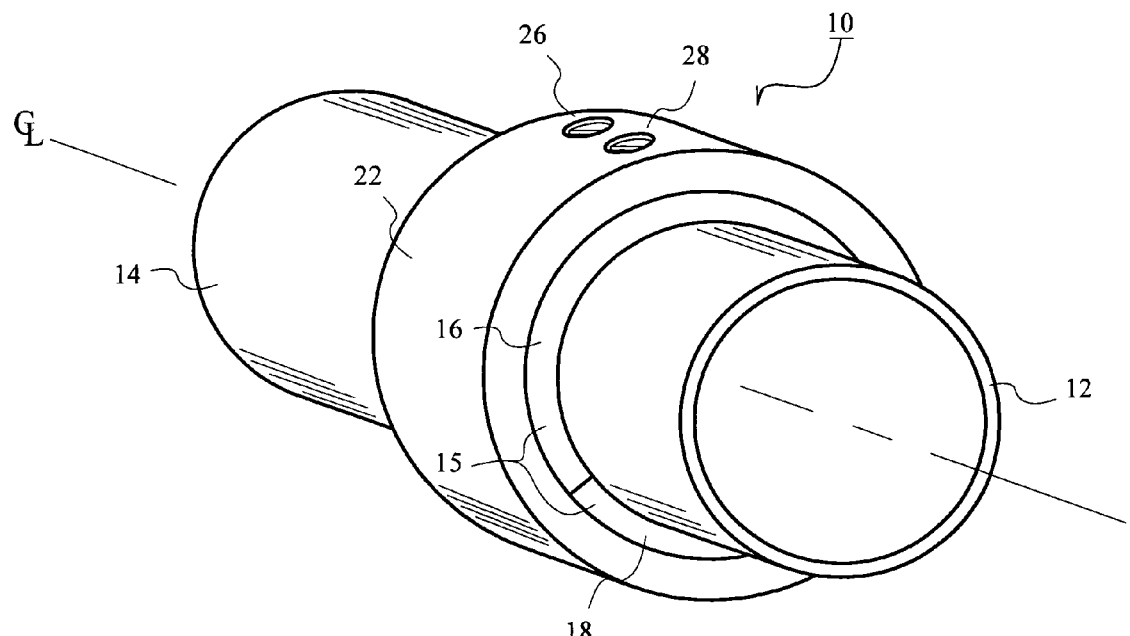
FIG. 1 is a perspective view of a pipe coupling device according to this invention.
Figure 2:
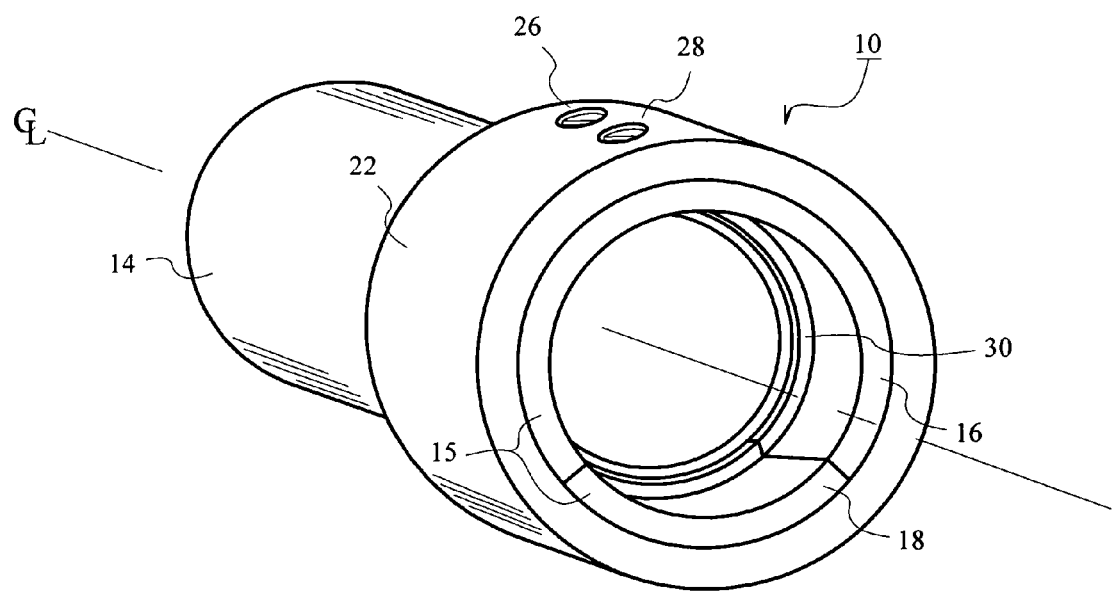
FIG. 2 illustrates the pipe coupling device without the obstructed view of a first pipe.

FIG. 1 is a perspective view illustrating a pipe coupling device 10 securing a first pipe 12 to a second pipe 14. FIG. 2 further illustrates the pipe coupling device 10 without the obstructed view of the first pipe 12.

Figure 3:
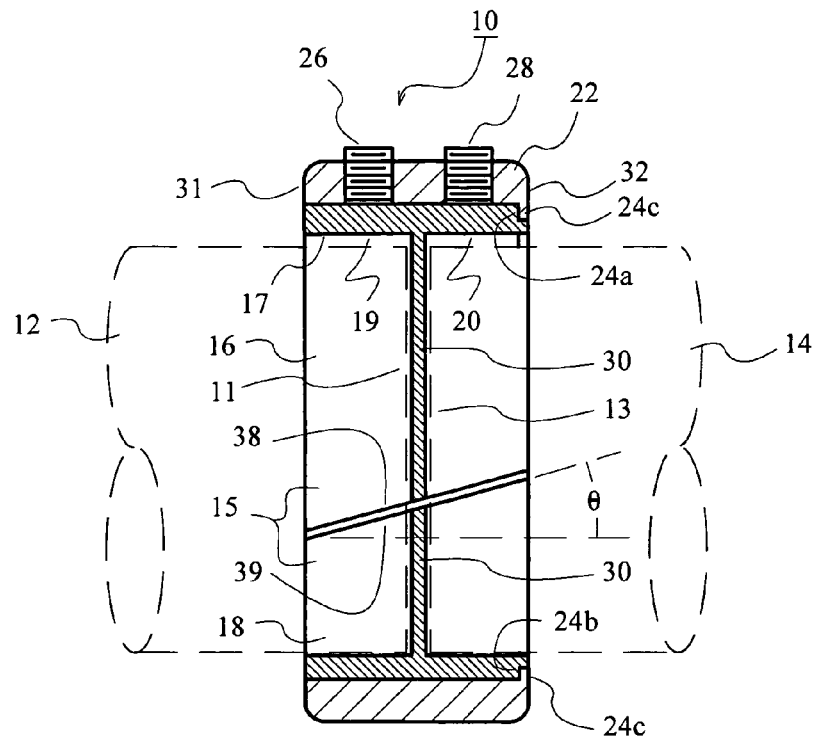
FIG. 3 is a cross-section view of a first embodiment for the pipe coupling device according to this invention.

FIG. 3 illustrates a first exemplary embodiment of the invention. As shown, the pipe coupling device 10 includes a collar 22, a first set screw 26, a second set screw 28 and a collet 15. The collet 15 is composed of a first collet portion 16 and a second collet portion 18 recessed within the collar 22. The first set screw 26 and the second set screw 28 are threaded within the collar 22 to secure the first collet portion 16 and the second collet portion 18 to the first pipe 12 and the second pipe 14.

Although only a first set screw 26 and a second set screw 28 are shown, it is to be understood that more or less set screws can be used at various other locations arranged in the collar 22 around the first pipe 12 and second pipe 14 in accordance with this invention. Various other fastening devices may be used for securing the pipe coupling device 10 to the first pipe 12 and the second pipe 14, such as clamps and/or any other fastening mechanism now known or later discovered in accordance with the present invention.

The collar 22 is designed to provide strength and rigidity to securely couple the first pipe 12 and the second pipe 14 to each other. The collar 22 includes a first side 31 and a second side 32. The first collet portion 16 and the second collet portion 18 are configured to fit with close tolerance within the collar 22. The first collet portion 16 includes a recessed channel 24a and the second collet portion 18 also includes a recessed channel 24b. The recessed channels 24a, 24b are designed to rest within a retaining flange 24c formed on the collar 22 adjacent to the second side 32 of the collar 22.

The first collet portion 16 and the second collet portion 18 are assembled into the collar 22 in a direction from the first side 31 to the second side 32 of the collar 22. Likewise, the first collet portion 16 and the second collet portion 18 is removed from the collar 22 in a reverse direction from the second side 32 to the first side 31 of the collar 22.

Figure 4C:
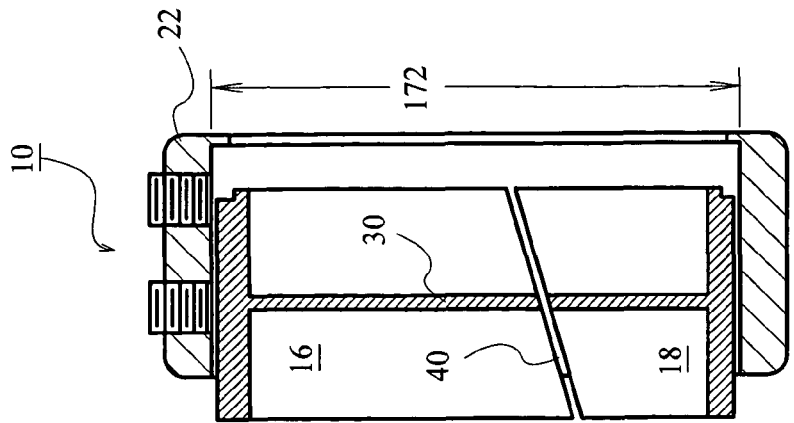
FIGS. 4a, 4b and 4c illustrate a cross-section view of a collet blank relative to a collar before and after a predetermined excess amount is removed from the collet blank according to the first embodiment of this invention.
Figure 4B:
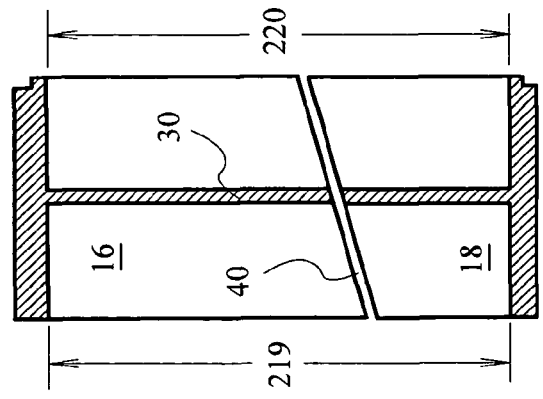
Figure 4A:
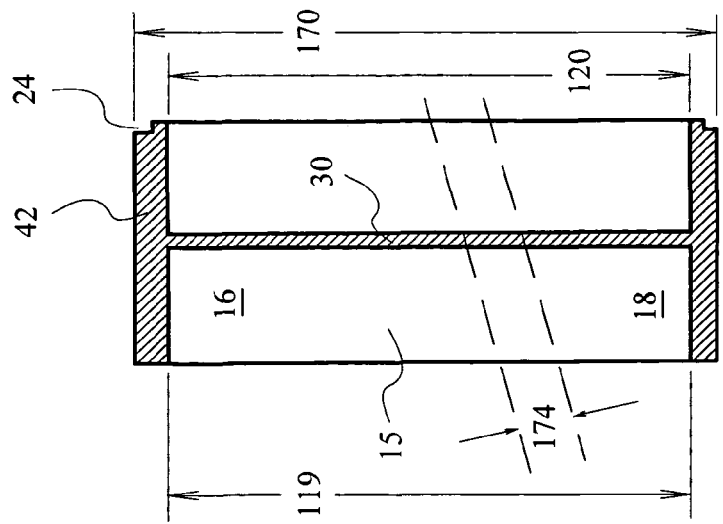

FIGS. 4a, 4b and 4c demonstrates an exemplary method for constructing the first collet portion 16 and the second collet portion 18 of the collet 15. A single contiguous collet blank 42 may be chosen in which an intermediate abutment 30 and a recessed channel 24 may first be machined. As originally machined, the length of the outer diameter 170 (FIG. 4a) of the collet blank 42 may be larger than an inner diameter 172 (FIG. 4c) of the collar 22. As a result, the inner diameter in the first region 119 and the inner diameter of the second region 120 of the uncut collet blank 42 are both larger than the machine-cut collet blank shown in FIG. 4b in which a predetermined amount of excess material 174 is removed (as shown in hidden lines in FIG. 4a), wherein a preferred separation gap 40 (as shown in FIG. 4b) may be formed.

As shown in FIG. 4b, after the predetermined amount of excess material 174 has been machined from the collet blank 42, the resulting two portions of the cut collet blank 42 form the first collet portion 16 and the second collet portion 18. Furthermore, when the predetermined amount of excess material 174 has been removed from the collet blank 42, the pre-cut radius of curvature of the first collet portion 16 and the second collet portion 18 contracts inwardly to form a post-cut reduced radius of curvature which operably permits the first collet portion 16 and the second collet portion 18 to fit within the collar 22. That is, when the first collet portion 16 and the second collet portion 18 are arranged within the collar 22, after the predetermined amount of excess material 174 has been removed, the inner diameter in the machined first region 219 and the inner diameter of the second region 220 (FIG. 4b) are less than their original inner diameters in the first 119 and second regions 120 (FIG. 4a) within the uncut collet blank 42.

FIG. 4c illustrates that when assembled, the first collet portion 16 and the second collet portion 18 fit smoothly within the collar 22 and the first pipe 12 and the second pipe 14 are received within a minimum predetermined tolerance defining the separation gap 40. A collet blank including a stepped lap joint 150 may be similarly manufactured as mentioned above with respect to the collet blank 42 having the intermediate abutment 30 described above.

The collet blank 42 may be fabricated in a variety different methods originating with a single piece of metal tubing, solid stock, a casting to form a rigid ring and the like.

The collet blank and/or any other component of this invention may be constructed from: billet shapes, solid rounds, extruded tubing, pipe, and the like. The various components of the pipe coupling device 10 may be made by being forged, molded, machined, extruded, and any other now known or later discovered method for producing this part in accordance with this invention. It is to be understood that the collet 15 is not limited to a first and a second collet portion, and may be composed of more than two portions.

Referring back to FIG. 3, the intermediate abutment 30 separates an inside diameter 17 of the collet 15 into a first region 19 and a second region 20. The inner diameter 17 of the collet 15 dynamically changes as the first and second set screws 26, 28 are tightened against the first collet portion 16. The first region 19 includes a first inner diameter 17 slightly large enough to receive the first pipe 12. The second region 20 includes a second Inner diameter 17 slightly large enough to receive the second pipe 14. According to this embodiment, the first pipe 12 and the second pipe 14 may be the same, or approximately, the same size.

In an assembled configuration, the intermediate abutment 30 forms a resting stop for an end portion 11 of the first pipe 12 and an end portion 13 of the second pipe 14. The intermediate abutment 30 aligns the first and second pipes 12, 14 within the first and second collet portions 16, 18 respectively. The intermediate abutment 30 may be disposed at the center between the first side 31 and the second side 32 of the collar 22 or anywhere along the inner diameter 17 of the collet 15.

The intermediate abutment 30 may be configured to center the first pipe 12 and the second pipe 14 within the pipe coupling device 10 to allow a maximum gripping to the surface area of each of the pipes 12, 14. In operation, the first collet portion 16 and the second collet portion 18 form a continuous concentric intermediate abutment 30 within the collar 22.

Figure 5:
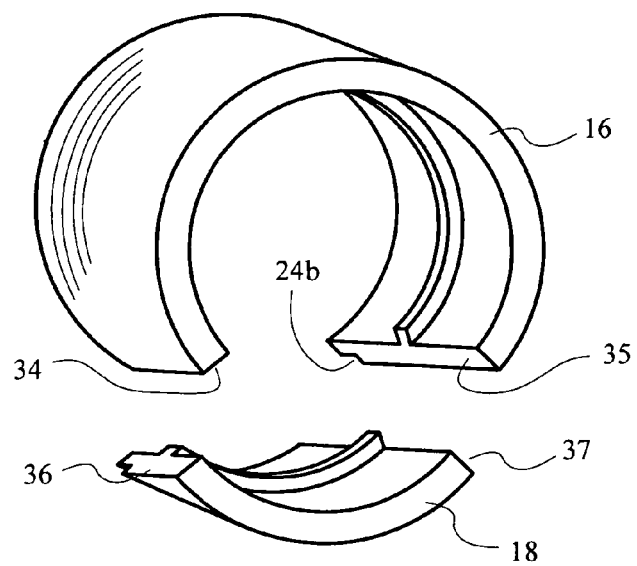
FIG. 5 is a perspective view of the first collet portion and the second collet portion according to this invention.

As shown in FIG. 5, the first collet portion 16 and second collet portion 18 define a mating circular sleeve-like configuration that receives the first pipe 12 and the second pipe 14. Separately, the first collet portion 16 is configured as an upper major arc having a first cross-section end surface 34 and a second cross-section end surface 35. As shown by the side view of FIG. 3, the first cross-section end surface 34 and the second cross-section end surface 35 are both machined to define a transverse angular cross-section surface 38. By contrast, the second collet portion 18 is configured as a lower minor arc having a first cross-section end surface 36 and a second cross-section end surface 37. Also shown in FIGS. 3 and 5, the first cross-section end surface 36 and the second cross-section end surface 37 are both machined to define a complementary transverse angular cross-section surface 39. The complementary transverse angular cross-section surface 39 of the second collet portion 18 is designed to mate with the transverse angular cross-section surface 38 of the first collet portion 16 within the collar 22.

FIGS. 6a, 6b, 6c, 7a, 7b and 7c describe the operation of securing the pipe coupling device 10 to the first pipe 12 and the second pipe 14 in three stages.

In STAGE 1 (FIGS. 6a and 7a), the first collet portion 16 and the second collet portion 18 are shown surrounding the first and second pipes 12, 14 inside of the collar 22. The first and second set screws 26, 28 are shown at rest and no force is being applied to the first collet portion 16.

FIGS. 6a and 7a show the separation gap 40 disposed between the first collet portion 16 and the second collet portion 18 in a loose open configuration. That is, prior to securing the pipe coupling device 10 to the first pipe 12 and second pipe 14, by tightening the first and second set screws 26, 28, the separation gap 40 is formed between the transverse angular cross-section surface 38 of the first collet portion 16 and the complementary transverse angular cross-section surface 39 of the second collet portion 18. Various other loosened gaps are shown, for example, a concentric gap 41 is disposed between the first collet portion 16 and the pipes 12, 14.

In operation (from stage 1 to stage 2), the first and second set screws 26, 28 are fastened against the first collet portion 16 until the first collet portion 16 engages the second collet portion 18. The first and second set screws 26, 28 may be tightened in a gradual alternating manner so that first collet portion 16 does not become misaligned between the collar 22 and the pipes 12, 14 and wedge itself into a cock-eyed position which is not flush against the collar 22 and the pipes 12, 14. That is, the first collet portion 16 is walked into a preferred position in which the transverse angular cross-section surface 38 of the first collet portion 16 is seated flush against the complementary transverse angular cross-section surface 39 of the second collet portion 18 as shown in FIGS. 6b and 7b.

In STAGE 2 (FIGS. 6b and 7b), the first and second set screws 26, 28 are shown tightened, and engaged, against the first collet portion 16 so that the transverse angular cross-section surface 38 of the first collet portion 16 is urged against the complementary transverse angular cross-section surface 39 of the second collet portion 18 until the separation gap 40 is closed and the first collet portion 16 is seated flush against the second collet portion 18.

FIG. 7b shows the separation gap 40 in a closed flush configuration. The concentric gap 41 is also being bias closed as a result of a force being applied by the first and second set screws 26, 28 on the first collet portion 18, which in turn, is being translated to close the second collet portion 18 against the pipes 12. The first and second set screws 26, 28 are further fastened against the first collet portion 16 in a gradual alternating manner into STAGE 3.

In STAGE 3 (FIGS. 6c and 7c), further tightening of the first set screw 26 and the second set screw 28 causes the transverse angular cross-section surface 38 of the first collet portion 16 to slide in the direction (S) flush at a descending angle $\theta$ along the complementary transverse angular cross-section surface 39 of the second collet portion 18 until a tight seal is securely formed between the first and second collet portions 16, 18 and the first and second pipes 12, 14. The concentric gap 41 is substantially eliminated so that the first collet portion 16 and the second collet portion 18 seat flush, and are sealed, concentrically against the first and second pipes 12, 14.

As shown in FIGS. 4a, 4b, 4c, 6a, 6b and 6c, the intermediate abutment 30 can be machined within the collet blank 42 prior to removing the predetermined amount of excess material 174. The movement of the intermediate abutment 30 of the first collet portion 16 will be minimal and therefore any gap that results therefrom will also be minimal (The figures are exaggerated to illustrate alignment offset). Any residual turbulence from the flow of fluid through the first and second pipes 12, 14 over any gap created by misalignment of 30 within the pipe coupling device 10 will be minimal.

Referring to FIGS. 7a, 7b and 7c, as force is applied by the first and second set screws 26, 28 onto, and translated through, the first and second collet portions 16, 18, the first and second collet portions 16, 18 inherently conform to the outer diameter of the first and second pipes 12, 14 via a parabolic action. The first collet portion 16 and the second collet portion 18 clasp and sit flush against the shape of the outer diameter of the first and second pipes 12, 14, thereby creating a seal and a secure pipe coupling. According to this invention, and as shown in FIG. 7c, a parabolic action may be expressed as the biased curved movement of the first and second collet portions 16, 18 toward, and being wrapped around to form a flush seal over the curvature of the first and second pipes 12, 14 as the first and second set screws are tightened against the first collet portion 16.

Figure 8C:
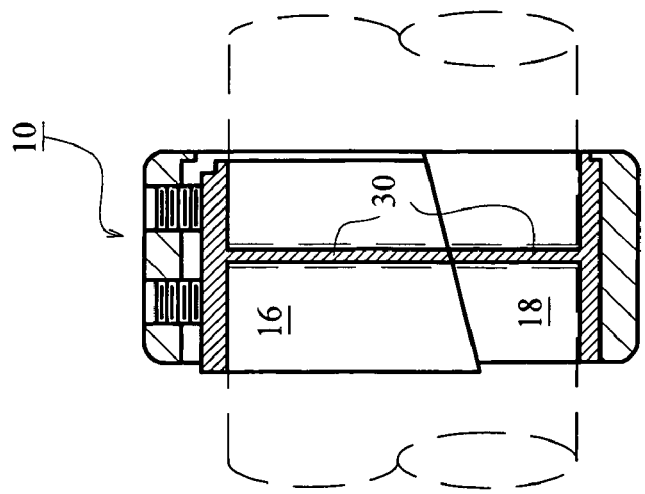
FIGS. 8a, 8b and 8c demonstrates disposition of an intermediate abutment to align the first and second pipes in a sealed and fastened position according to this invention.
Figure 8B:
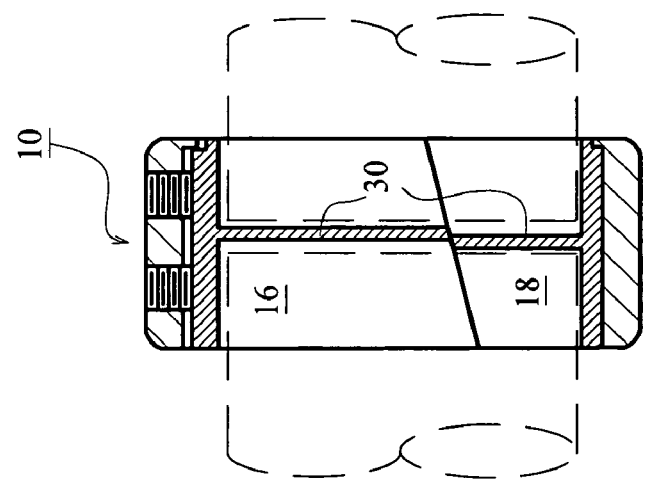
Figure 8A:
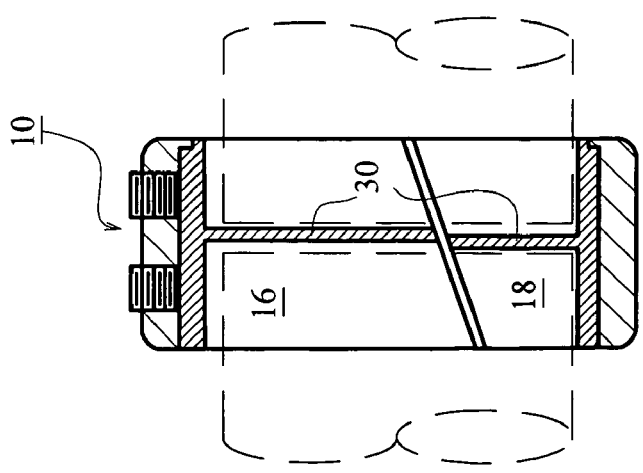

As shown in FIGS. 8a, 8b and 8c, it should be noted that the intermediate abutment 30 can be machined inside of the first and second collet portions 16, 18 such that when the first and second collet portions 16, 18 are initially engaged with each other, the intermediate abutment 30 is slightly offset in alignment (FIG. 8b) to account for the additional transverse movement that the upper collet portion 16 will move along the complementary angular transverse surface 39 until it comes to rest on top of the first and second pipes 12, 14 (FIG. 8c). As shown in FIG. 8c), in the sealed resting position, the intermediate abutment 30 is substantially aligned flush against the ends of the first and second pipes 12, 14.

Figure 9:
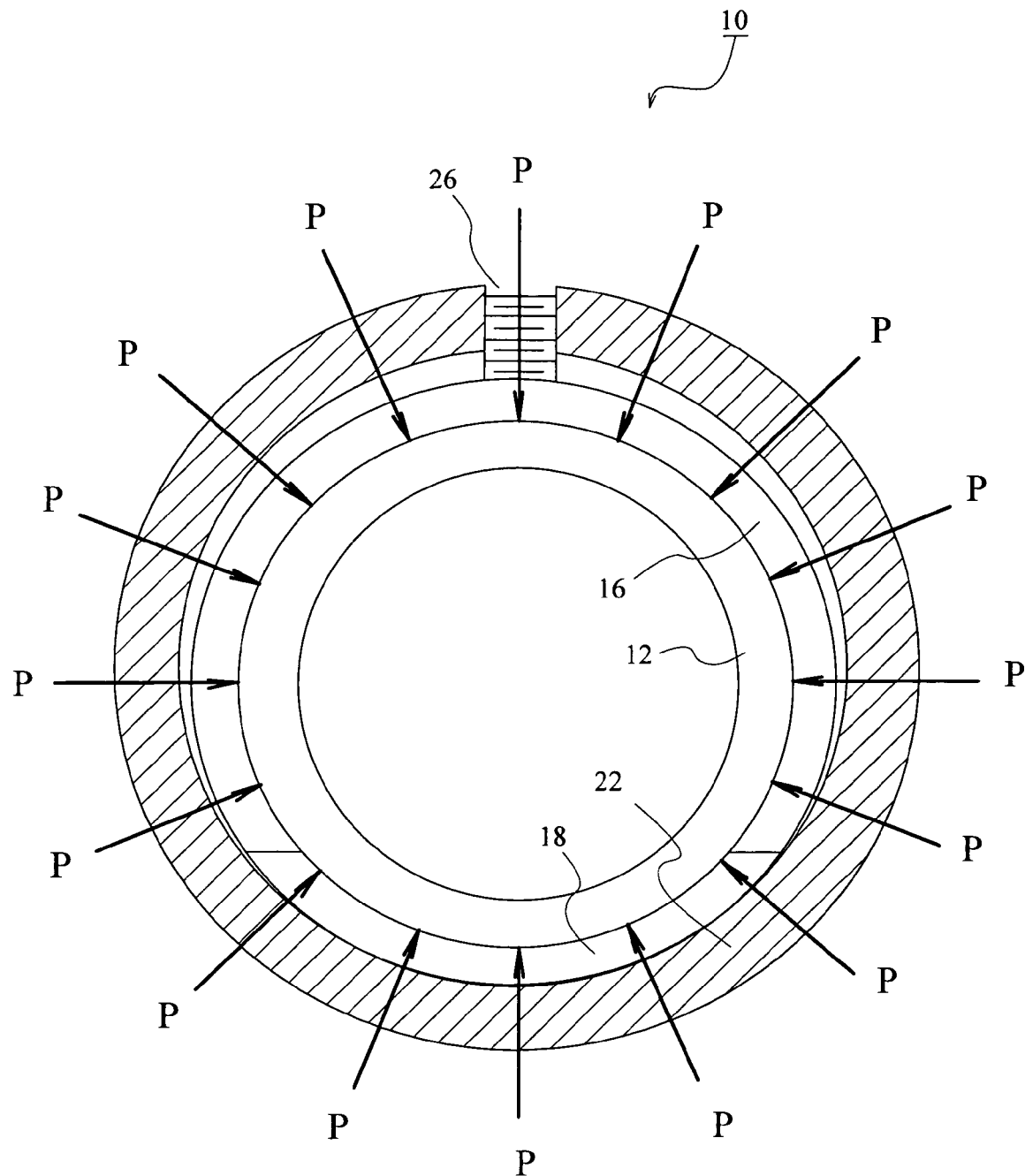
FIG. 9 demonstrates the even distribution of forces on the first pipe in accordance with this invention.

FIG. 9 illustrates the even distribution of force (P) on the pipe coupling device 10 in a final secured position (FIG. 7c in stage 3). Due to parabolic action and the sliding angular movement of the first collet portion 16 along the complementary transverse angular surface 39 and over the pipes 12, 14, distributed circumferential force (P) is generated around the pipes 12, 14. The distributed circumferential force (P) is applied evenly between the first and second collet portions 16, 18 and the first and second pipes 12, 14, thereby securely sealing and fastening the first and second pipes 12, 14 to each other.

Another objective of securing the pipe coupling device 10 is to provide a device that allows the first collet portion 16 and the second collet portion 18 to form a seal by self seating against each other. It is also an objective to secure the pipe coupling device 10 without causing substantial inelastic disfigurement to the first pipe 12 or the second pipe 14.

Unlike conventional pipe clamps or couplings, this invention is not invasive or mechanically intrusive to the pipes being secured together. Accordingly, longer use of the pipe coupling device 10 and the first pipe 12 and second pipe 14 is a feature of this invention. Stress induced on the pipes is also minimized in that the pipes 12, 14 are secured by an evenly distributed force (P) applied circumferentially (see FIG. 9) to the first pipe 12 and the second pipe 14. As a result, the first collet portion 16 and the second collet portion 18 are elastically contoured to clamp the first and second pipes 12, 14 in such a manner that dimpling does not occur and none of the components of the pipe coupling device 10 are mechanically deformed. On the contrary, pipes which may not be purely concentric are biased into a nearly true circular configuration when clamped by the pipe coupling device 10. Accordingly, the integrity and strength of the pipe coupling device 10 as well as the pipes 12, 14 is maintained. Interchangeability among the various components in the pipe coupling device 10 and its various component parts of this invention are also preserved for repetitive use.

Depending on the application, various types of materials may be used in accordance with this invention. If the pipe coupling device 10 is to be used in a liquid environment, materials (e.g., rubber, polymers, and the like) that are favorable for sealing fluids may be chosen. For example, the first collet portion 16 and second collet portion 18 may be made of a resilient sealing material that prevents fluid from escaping there between. The inner surfaces of the first collet portion 16 and second collet portion 18 may be deposited on with a material having sealing qualities.

Alternatively, the collet 15 may be made out of a durable gasket material to provide a seal when the pipe coupling device 10 is arranged and secured by the second set screw 28 and the first set screw 26. The material used to provide a seal may be chosen such that it can withstand the various compression forces incurred by the various components of the pipe coupling device 10. Alternatively, O-rings and other types of gaskets may be added to provide a seal in the pipe coupling device 10. The collet 15 may be designed to accommodate the O-rings and/or gaskets such as by including a grooved recess in the pipe coupling device 10 and/or collet 15 for receiving the O-rings and/or gaskets.

In environments subject to extreme temperatures, an insulation material (e.g., ceramic, porous materials, metals, aluminum, and the like) may be used to protect adjacent components from extreme temperatures. An exemplary environment where extreme temperatures may be desired may include a vehicle engine operating environment in which running hotter would yield better gas mileage.

Alternatively, if rapid heat dissipation is desired, heat conductive materials (e.g., metals, aluminum, and the like) may be used to rapidly diffuse heat away from the internal components of the pipe coupling device 10 to the ambient air. Alternatively, the outer surface, or various portions of the pipe coupling 10 may incorporate radiant heat reducing features, such as baffles, fins and/or any other heat dissipating configurations now known or later developed in accordance with this invention. An exemplary environment where rapid heat dissipation would be desired may include use of the pipe coupling device 10 having heat dissipating features in a motorcycle engine.

Other types of materials that may be used include for example: alloys such as an aluminum alloy, nickel alloy, duranickle, monel alloy, inconel alloy, incology alloy carbon steel, stainless steel, copper, brass, bronze, titanium of commercial and/or aircraft quality, a 14 gauge aluminized tubing and the like. Various polymers may also be used to construct any one of the various components according to this invention. Some of the polymers being used may include for example: polyvinyl chloride (PVC), high density polyethylene pipe (HDPE), teflon, delrin, an injection molded plastic and/or any other type of resilient material in accordance with this invention It is to be understood that the material listed and/or the components of this invention being constructed are not intended to be limiting and may include any other type of material or process for configuring any of the components that is now known or later developed in accordance with this invention.

This invention has a variety of applications. Some of which those included for use in: a vehicle exhaust system, plumbing, heaters, defroster tubes, racks, including luggage racks and ladder racks, drape rods, rain gutters, vehicles, such as: trucks, motorcycles, go-carts, generators, boats, as an electrical conduit coupler, heavy equipment, umbrellas/umbrella stand, gardening equipment, flag pole holder, security devices, superchargers and turbochargers, air induction tubing, hose fittings, structural tubing, telescoping applications, clamps, add the like.

Each of the features and advantages of this embodiment are applicable to the various exemplary embodiments described below.

Figure 10:
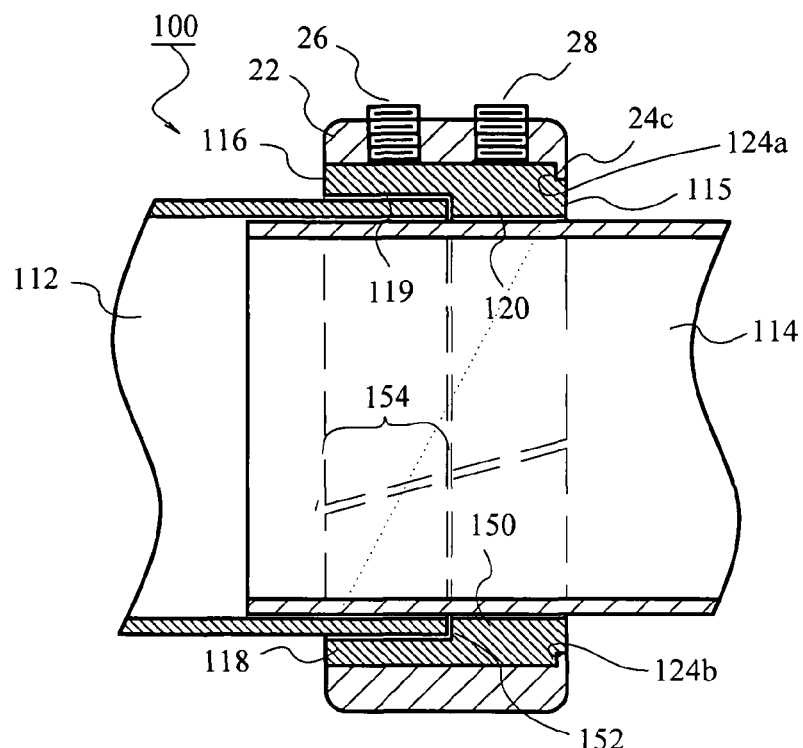
FIG. 10 is a cross-section view of a second embodiment for the collet of the pipe coupling device including a stepped lap joint according to this invention.

FIG. 10 illustrates a second embodiment for the collet 115 in accordance with this invention. Similar reference numbers for like components will be applied with respect to this embodiment. FIG. 10 is a cross-sectional view of a pipe coupling device 100. The pipe coupling device 100 shows a collet 115 including a first collet portion 116 and a second collet portion 118 recessed within a collar 22. A first set screw 26 and a second set screw 28 are also shown threaded within the collar 22 to secure the first collet portion 116 and the second collet portion 118 to the first pipe 112 and the second pipe 114.

The first collet portion 116 and the second collet portion 118 are shown assembled within the collar 22. The first and second collet portions 18, 16 also include recessed channels 124a, 124b. The recessed channels 124a, 124b are aligned to rest within a retaining flange 24c formed on the collar 22.

The pipe coupling device 100 includes a stepped lap joint 150 formed on an inside of the first collet portion 116 and the second collet portion 118. The stepped lap joint 150 defines a first region 119 having a first inner diameter slightly large enough to receive the first pipe 112. In an assembled configuration, the stepped lap joint 150 forms a resting stop 152 for an end portion of the first pipe 112. The stepped lap joint 150 aligns the first pipe 112 within the first collet portion 116 and second collet portion 118. The stepped lap joint 150 also defines a second region 120 having a second inner diameter that is slightly large enough to receive the second pipe 114.

The stepped lap joint 150 is configured so that during assembly the second pipe 114 is allowed to translate telescopically within the inside diameter of the first pipe 112 into any preferred position. When arranged in the preferred position within the collar 22, the first collet portion 116 and the second collet portion 118 form the stepped lap joint 150 for positioning the first pipe 112 and the second pipe 114. An overlap portion 154 within a region of the collet 115 is provided in which both the first pipe 112 and the second pipe 114 are overlapped by the collet 115.

Figure 11:
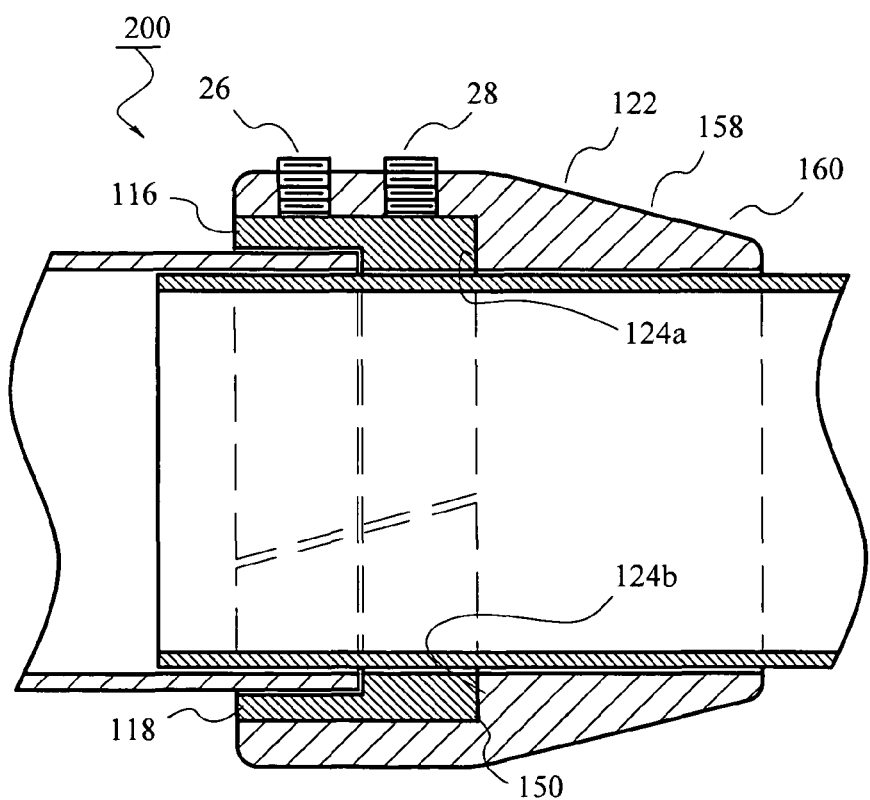
FIG. 11 is a cross-section view of another exemplary embodiment for the collar having an extended tapering collar portion according to this invention.

FIG. 11 illustrates an alternative embodiment for a collar according to another embodiment for a pipe coupling device 200. According to this construction, a tapered collar 122 includes an angular portion 158 that extends into a tapered end 160. The tapered end 160 of the tapered collar 122 provides additional strength and rigidity to the body of the tapered collar 122. Although only one tapered end 160 is shown in FIG. 11, it is understood that either side of the collar may be extended into a tapered end.

Figure 12:
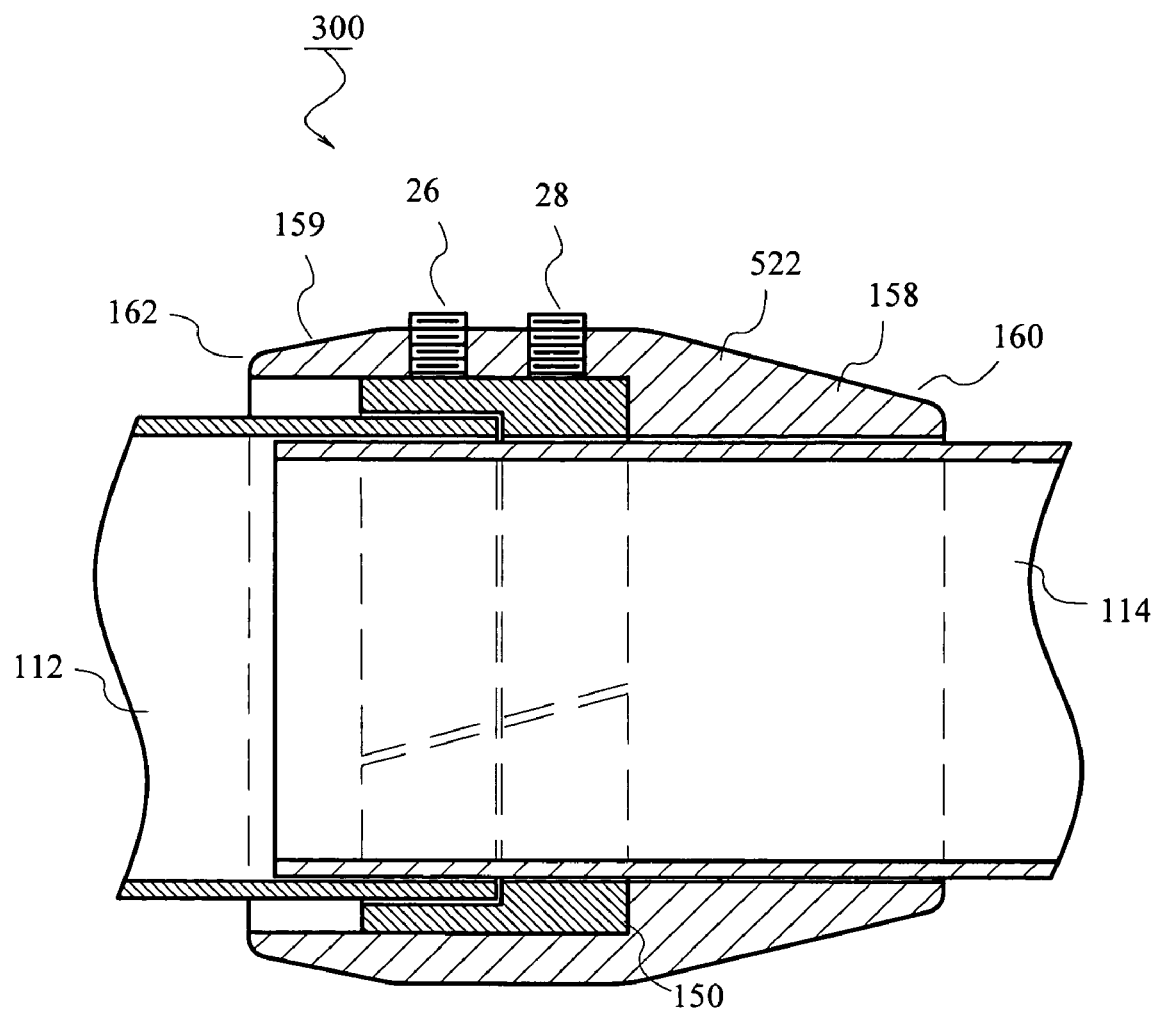
FIG. 12 is a cross-section view of a third exemplary embodiment for the collar including a dual extended tapering collar portion according to this invention.

FIG. 12 shows a dual tapered edge collar 522 according to another embodiment for a pipe coupling device 300. The dual tapered edge collar 522 includes a first angular portion 158 that extends into a first tapered end 160 and a second angular portion 159 that extends into a second tapered end 162. According to this invention, the tapered ends 160, 162 can be extended to any preferred operable length.

For exemplary purposes only, the pipe coupling devices 200, 300 also include a stepped lap joint 150 formed on an inside of the first and second collet portions 116, 118 that operates to align the first and second pipes 112, 114 as discussed above with respect to FIG. 10.

The tapered ends 160, 162 provide various advantages including additional heat insulation to areas subjected to extreme temperatures. As mentioned previously, the collar 122 may be composed of a material conducive to insulating heat. Alternatively, the tapered end 160 of the collar 122 may be made of a composition or configured to provide enhanced heat dissipation qualities, like fins or baffles, so as to keep the pipe coupling devices 10 and the environment surrounding that area cool.

As similarly described in FIG. 10, the collar 122 of FIG. 11 houses the first collet portion 116 and the second collet portion 118. The first collet portion 116 and the second collet portion 118 are disposed around first pipe 112 and the second pipe 114. A first set screw 26 and a second set screw 28 are provided as the fastening mechanisms.

The first collet portion 116 and the second collet portion 118 are installed within the collar 122 against recessed channels 124a, 124b. The first collet portion 116 and the second collet portion 118 are aligned to rest within the recessed channel 124b formed on the collar 122.

Figure 13:
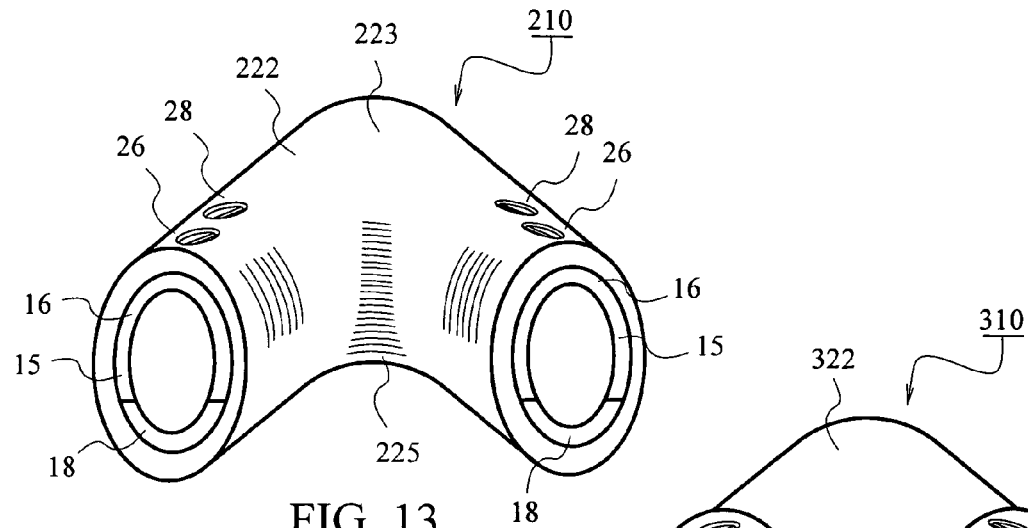
FIG. 13 is a perspective view of a first alternative embodiment for an angular pipe coupling device according to this invention.
Figure 14:
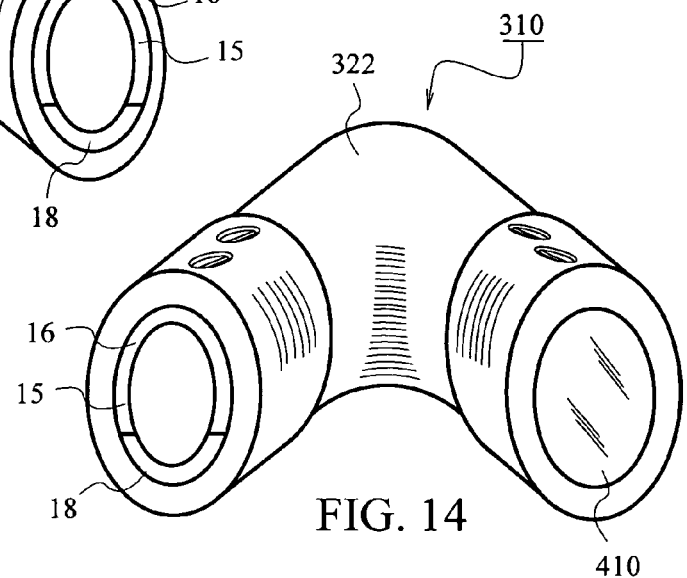
FIG. 14 is a perspective view of a second embodiment for the angular pipe coupling device including a closed blunt-end collar portion according to this invention.
Figure 15:
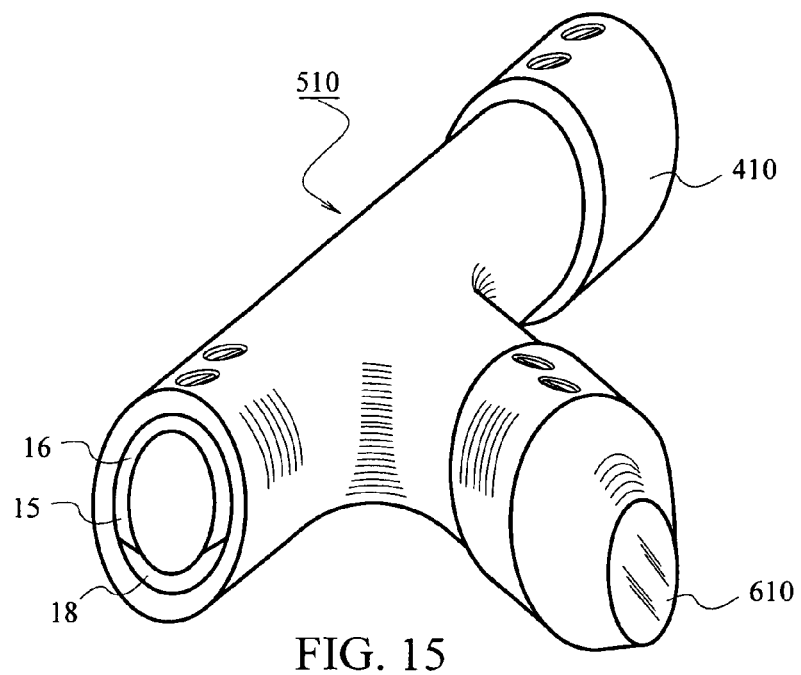
FIG. 15 is a perspective view of a third embodiment for the angular pipe coupling device including an extended tapering closed blunt-end collar portion according to this invention.

FIGS. 13, 14 and 15 are perspective views for angular pipe coupling devices 210, 310, 410, 510 and 610 according to various exemplary embodiments of this invention. In particular, FIG. 13 illustrates a perspective view of an angular pipe coupling device 210. The angular pipe coupling device 210 includes an angular collar 222 in which an outer body casing 223 of the angular collar 222 is configured to include a preferred angular bend 225. The angular bend 225 can be any preferred angle. A pair of collets 15 including a first collet portion 16 and a second collet portion 18 are recessed at each end of the angular pipe coupling device 210 for receiving pipes (not shown).

First and second set screws 26, 28 are also shown disposed at each end of the angular pipe coupling device 210 for fastening each of the first and second collet portions 16, 18 to the first and second pipe (not shown) respectively. The collets 15 are shown installed within the angular collar 222 and secured in the manner described above. The collets 15 in the angular pipe coupling device 210 may include either, one of or both, an intermediate abutment 30 or a stepped lap joint 150 (as described above) according to this invention.

FIG. 14 illustrates another exemplary embodiment for an angular pipe coupling device 310. The angular pipe coupling device 310 may be composed of a collar 322 bent into a desired orientation having an enlarged portion adjacent to the ends of the collar 322. Alternatively, FIG. 14 also demonstrates that a pipe coupling device 410 can include a blunt end cap pipe to shut off flow there through.

FIG. 15 illustrates another exemplary embodiment for an angular pipe coupling device 510. As shown, numerous extensions can be incorporated into the angular pipe coupling device 510. According to this embodiment, a recessed collet 15 may be provided within a first extension, a blunt end cap pipe coupling device 410 is provided in a second extension, and a tapered blunt end cap pipe coupling device 610 may be provided in the third extension to shut off flow of fluid therethrough. According to this invention, the various pipe coupling devices 210, 310, 410, 510, 610 may be interchanged quickly and with ease to an installer in such a manner that there is no substantial deformation to the first and second pipes 12, 14.

According to various objectives and advantageous in accordance with this invention, various considerations are taken into account to determine an appropriate size for the first collet portion 16 and the second collet portion 18. Referring to FIGS. 1, 2, 6a, 6b and 6c, at rest, a separation gap 40 is evident between the first collet portion 16 and the second collet portion 18. When the first collet portion 16 and the second collet portion 18 are tightened around the first pipe 12 and the second pipe 14, the gap is substantially eliminated. The separation gap 40 may be disposed below an axial centerline CL of the pipe coupling device 10 (as shown in FIGS. 2, 7a, 7b and 7c).

Another consideration is the outer diameter size of the first pipe 12 and the second pipe 14. The material properties of the first pipe 12, the second pipe 14, and the pipe coupling device 10 and their interaction may also be taken into consideration. For example, if the pipe coupling device 10 is used in a vehicle exhaust temperature environment, the pipe coupling device 10 and the first pipe 12 and the second pipe 14 will undergo extreme temperatures. Subject to the extreme temperatures, the various components will experience continuous material cycles of expansion, contraction and even possibly fracture of the materials. Thus, the material properties of the components used may be a significant consideration.

The initial size of the collet stock 42 (FIG. 4a) is also a consideration when determining an appropriate amount of excess material to be machined off to form the separation gap 40 defined by the first collet portion 16 and the second collet portion 18 within the collar 22.

As shown in STAGE 3 (FIG. 6c), the remaining separation gap 140 formed between the second collet portion 16 and the first pipe first pipe 12 and the second pipe 14, may be manufactured so that when the first 18 and second collet portions 16 are further tightened against the first pipe 12 and the second pipe 14, the first collet portion 16 and the second collet portion 18 substantially girdle or encircle the entire concentric surface area of the first pipe 12 and the second pipe 14 thereby creating a continuous concentric seal around each of the pipes 12 and second pipe 14 (FIG. 6c).

The objective is to machine a portion of a collet stock so that the remaining portion (which then becomes the first collet portion 16 and the second collet portion 18) compresses and interlocks into a nearly concise concentric collet that provides a seal by maximizing its engagement over the surface area of the first and second pipes 12, 14.

One method for determining a preferred separation gap 40 is by selecting a piece of collet stock 42 and machining it so that the machined product has a slightly larger outer diameter that the first and second pipes 12, 14. When a calculated amount of the collet stock is removed and the first collet portion 16 and the second collet portion 18 are formed, they are configured such that when the fastening device is threadedly secured to the pipes, the first collet portion 16 and the second collet portion 18 evenly engage a maximum amount of the surface area surrounding the pipes 12, 14. The result of allowing the pipes to engage over a maximum surface area is to allow the point force that is applied by the first and second set screws 26, 28 to be converted to an evenly applied distributed concentric force (P) over the entire surface area of the pipes 12, 14 and eliminating the separation gap 40 as shown in FIG. 9.

Likewise, the separation gap 40 may be selected so that when the transverse angular cross-section 38 of the first collet portion 16 and the complementary transverse angular cross-section 39 of the second collet portion 18 engage each other, a predetermined amount of lateral movement is translated prior to fastening around the first pipe 12 and the second pipe 14 and forming a seal.

FIGS. 6a, 6b and 6c illustrates the transverse angular cross-section surface 38 of the first collet portion 16 is separated at a distance 42 from the complementary transverse angular cross-section surface 39 of the second collet portion 18. The transverse angular cross-section surface 38 and the complementary transverse angular cross-section surface 39 are disposed at an angle θ (see FIG. 6c). The angle θ may be chosen at any angle up to about 90 degrees. It is also to be understood that the transverse angular cross-section surface 38 and the complementary transverse angular cross-section surface 39 may include a number of various interlocking configurations, such as for example, the interlocking illustration shown in FIG. 16.

FIG. 16 illustrates, between a first side 161 and a second side 162 of the first collet portion 16, a first interlocking cross-section surface 138 includes a first angular decline surface 138a that slopes downward to a predetermined position, and returns back upward at a second angular incline surface 138b. A second interlocking cross-section surface 139 of the second collet portion 18 is shown having a complementary second interlocking cross-section surface 139, 139a, 139b configured to mate with the first interlocking cross-section surface 138.

FIGS. 17a, 17b and 17c demonstrate the closing of the separation gap 40 through movement of the first collet portion 16 along the surface of the second collet portion 18. As shown, the separation gap 40 may be machined having an additional angle β which biases the first collet portion 16 toward the first pipe 12. According to this embodiment, the transverse angular cross-section surface 38 of the first collet portion 16 and the complementary transverse angular cross-section surface 39 of the second collet portion 18 are shown machined at an angle β. The angle β may be chosen at any angle up to about 90 degrees.

In operation, two angles of translation are apparent. The first angle (angle θ as shown in FIG. 6c) is the translation of the transverse angular cross-sectional surface 38 of the first collet portion 16 along the complementary transverse angular cross-sectional surface 39 of the second collet portion 18 having movement along the axial direction of the collet 15.

The second angle (β as shown in FIG. 17c) is the translation of the transverse angular cross-sectional surface 38 of the first collet portion 16 along the complementary transverse angular cross-sectional surface 39 of the second collet portion 18 having movement in the direction along the radius of curvature of the outside diameter of the first and second pipes 12, 14.

In operation, the first collet portion 16 translates along the downward sloped transverse surface along the axial direction (at an angle θ) of the pipe coupling device 10 as well as inward along the radius of curvature of the pipe 12 (at an angle β) along an inwardly angled surface disposed on the complementary transverse surface 39 of the second collet portion 18. The objective of providing the additional translation along the angle β surface is to further assist the uniform clamping of the first collet portion 16 and the second collet portion 18 against the first pipe 12 and the second pipe 14 in an evenly distributed manner. In the alternative, translation along the angle β may be the only angle provided between the first and second collet portions 16, 18.

FIG. 18a illustrates another exemplary embodiment for a splined collet 715 including a first splined collet portion 716 and a second splined collet portion 718. The first splined collet portion 716 is composed of two portions, a first splined inner surface portion 720 and a first smooth inner surface portion 724. Likewise, the second splined collet portion 718 is also composed of two portions, a second splined inner surface portion 722 and a second smooth inner surface portion 726. The first and second smooth inner surface portions 724, 726 are disposed to allow smooth transverse movement of a transverse angular surface 38 of the splined collet portion 716 about a complementary transverse angular surface 39 of the second splined collet portion 718.

Operation of the first splined collet portion 716 and a second splined collet portion 718 about a first splined pipe (not shown) and a second splined pipe (not shown) is similar in operation to that described above with respect to FIGS. 6a, 6b and 6c. The mating splines disposed within the inner surface of the splined collet 715 are designed to smoothly cooperate with the splines on the first and second splined pipes (not shown) to form a secure joint.

FIG. 18b illustrates yet another embodiment including a splined collet 815 having splines throughout the entire inner circumference of the splined collet 815. The splined collet 815 includes a first splined collet portion 816 and a second splined collet portion 818. The spline interaction between the first and second splined collet portions 816, 818 are fabricated to allow smooth transverse movement of a transverse angular surface 38 of the first splined collet portion 816 about a complementary transverse angular surface 39 of the second splined collet portion 818. The splines disposed within the splined collet 815 adjacent to the separation gap 40 may be disposed at a minimum height and/or thickness to allow smooth transverse movement.

Figure 19:
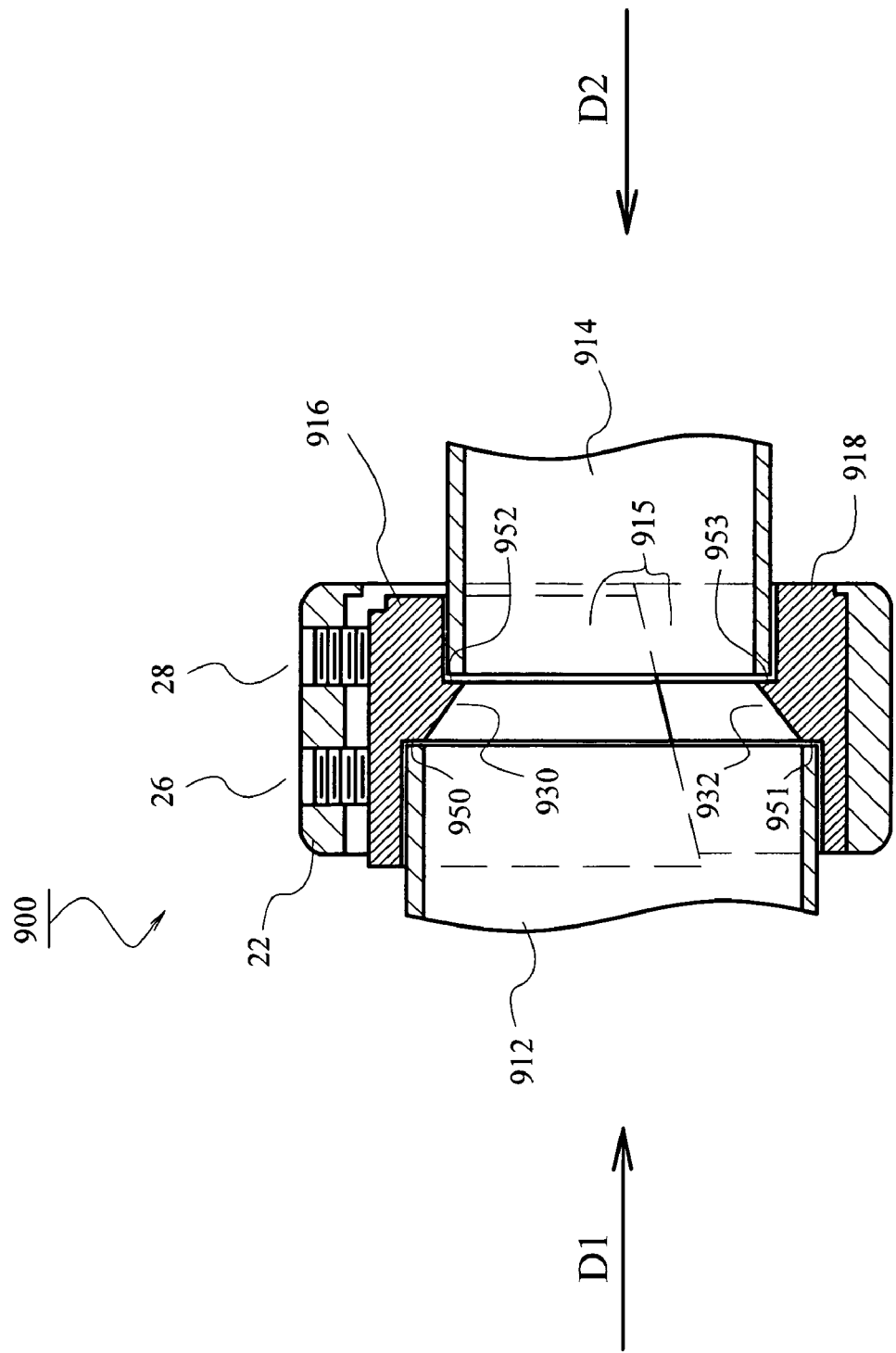
FIG. 19 illustrates an exemplary reducer/expansion pipe coupling device in accordance with this invention.

FIG. 19 illustrates yet another exemplary collet 915 including a first collet portion 916 and a second collet portion 918 configured as a reducer pipe coupling device 900. The reducer pipe coupling device 900 includes a first angular flange 930 formed on an inside of the first collet portion 916 and a second angular flange 932 formed on an inside of the second collet portion 918. Together, they form an internal constriction through which fluid enters in a direction labeled D1 from a first pipe 912 at a larger diameter and exits the reducer pipe coupling device 900 through a second pipe 914 having a smaller diameter.

In particular, the first pipe 912 is received into the reducer pipe coupling device 900 and is butt-up against a first abutment formed by a first recessed flange 950 disposed in the first collet portion 916, and a first recessed flange 951 disposed in the second collet portion 918. Likewise, the second pipe 914 is received and is butt-up against a second abutment formed by a first recessed flange 952 disposed in the first collet portion 916, and a second recessed flange 953 disposed in the second collet portion 918.

The first and second angular flanges 930, 932 are aligned concentrically through the collet 915 and function to constrict the flow of fluid received by the first pipe 912 and discharged through the second pipe 914.

Although this embodiment is shown as a reducer, according to another aspect of this invention, the pipe coupling device may be used as an expansion pipe coupling device so that together, the first angular flange 930 and the second angular flange 932 form an internal expansion through which fluid enters (D2) from the second pipe 914 at a smaller diameter and exits the expansion pipe coupling device 900 through the first pipe 912 having a larger diameter.

In FIG. 19 for example, the flow of fluid would be in the reverse direction D2 as described above for an expansion coupling device. Fluid flow characteristics for reducers and expansion coupling devices are common knowledge in industry and will not be discussed at length herein. In both of variations (constriction and expansion), it is also understood that the first and the second pipes may be the same size.

Various methods and relationships may be used to determine the various parameters for the components of the pipe coupling device 10 as mentioned above in accordance with this invention. Another method for determining an operable separation gap, a preferred transverse angle of the first and second collet portions, and an operable distance for the transverse movement in accordance can be represented by the following mathematical expression:

$$D_T = D_A - (F/\cos\theta)*3$$

where:
$D_T$ is a Theoretical Diameter;
F is the Separation Gap;
$D_A$ is an Actual Diameter, where $D_A = D_{T+}F$; and
$\theta$ is the angle for the transverse surface of the separation gap.

The source of this formula is the result of various practical applications. Through numerous iterations, the preferred angle $\theta$ for the transverse surface of the separation gap is approximately 17.3 degrees. However, it is to be noted that various angles may be used in the range from approximately 0 to 90 degrees. As the angle $\theta$ is varied, the relationship between the theoretical diameter ($D_T$), the separation gap (F) and the actual diameter ($D_A$) is also varied such that the resulting first and second collet portions will cooperate with each other to form a secure and firm seal around a first and a second pipe with the pipe coupling device.

It is to be noted that determining the separation gap is not limited to this method described above. The separation gap may be determined by a variety of different schemes in accordance with the objects of this invention.

According to another exemplary embodiment of this invention, the pipe coupling device and parameters defining the device may be implemented in a computer readable storage medium. The computer readable program code embodied on the computer readable storage medium. The computer readable program code may be usable to program a computer, such as a Computer Numerical Control (CNC) unit or the like to create the pipe coupling device. The computer readable program code includes instructions for machining a collar. From a collet blank, machining a first semicircular collet portion that interlocks with a second semicircular collet portion to form a circular fastening device that secures the first pipe to the second pipe within the collar in accordance with parameters specified by the program code may also be included. It is to be noted that the software code embedded in the computer readable code may have various practical application in a host of different technologies as mentioned above in accordance with this invention.

Instructions to machine the interlocking surface may be provided so that the first semicircular collet portion and the second semicircular collet portion matingly interlock. The interlocking surfaces may be machined at a predetermined angle in accordance with parameters specified by the program code.

Any number of data information storage techniques is appropriate for the computer readable storage medium of the pipe coupling device. The computer readable storage medium can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

A communication link may be provided to issue the computer readable instructions from the computer readable storage medium located remote or local to the device implementing the stored instructions. The communication link may include one or more of a direct cable connection, a connection over a wide area network or a local area network, a connection over an intranet, a connection over the Internet, or a connection over any other distributed processing network or system. In general, the communication link can be any known or later developed connection system. The communication link can be a wired or wireless link to a network.

It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed is:

1. A pipe coupling device that secures a first pipe to a second pipe, comprising:
    a collar having a central axis and including a fastening mechanism disposed through a cylindrical body of the collar and transverse to the central axis; and
    a cylindrical collet, concentrically disposed within the collar and substantially aligned with the central axis, comprising:
        a first collet portion configured as an upper major arc having a transverse surface angularly offset from the central axis; and
        a second collet portion configured as a lower minor arc having a complementary transverse surface angularly offset from the central axis that mates with the transverse surface of the first collet portion within the collar, wherein when the fastening mechanism is tightened, the first collet portion is urged to slidably translate in an angular direction along its transverse surface, and flush over the complementary transverse surface of the second collet portion until the first and second collet portions securely clamp the pipes.

2. The pipe coupling device recited in claim 1, wherein the first collet portion and the second collet portion include a stepped lap joint which allows the first pipe and second pipe to telescope relative to each other along the central axis of the collar.

3. The pipe coupling device recited in claim 1, wherein the first collet portion and the second collet portion include an abutment joint which allows the first pipe and second pipe to substantially butt up adjacent to each other.

4. The pipe coupling device recited in claim 3, wherein the abutment joint further comprises:
   a first angular flange disposed on an inside of the first collet portion; and
   a second angular flange disposed on an inside of the second collet portion, which together form a constricting portion into which fluid enters from the first pipe having a larger diameter and exits through the second pipe having a smaller diameter.

5. The pipe coupling device recited in claim 3, wherein the abutment joint further comprises:
   a first angular flange disposed on an inside of the first collet portion; and
   a second angular flange disposed on an inside of the second collet portion, which together form an expansion portion into which fluid enters from the first pipe having a smaller diameter and exits through the second pipe having a larger diameter.

6. The pipe coupling device recited in claim 1, wherein the collar is an angled collar that receives the first pipe and the second pipe.

7. The pipe coupling device recited in claim 6, wherein the angled collar includes a first collet disposed at a first end and a second collet disposed at a second end.

8. The pipe coupling device recited in claim 1, wherein the collar includes at least one extended tapered end.

9. The pipe coupling device recited in claim 1, wherein the first collet portion and the second collet portions include an abutment surface that mates with and aligns within a retaining flange disposed within the collar.

10. The pipe coupling device recited in claim 1, wherein the fastening mechanism is at least one threaded fastener disposed within the collar.

11. The pipe coupling device recited in claim 1, wherein when the fastening mechanism is tightened, the fastening mechanism imparts a point force through the collar onto the first collet portion which in turn converts the point force onto the first and second pipes into an evenly distributed circumferential radial force surrounding each of the pipes.

12. The pipe coupling device recited in claim 1, wherein before the fastening mechanism is tightened, a predetermined separation gap is defined between the transverse surface of the first collet portion and the complementary transverse surface of the second collet portion when the collet is disposed within the collar.

13. The pipe coupling device recited in claim 1, wherein the first collet portion and the second collet portion form a splined collet that receives a first splined pipe and a second splined pipe.

14. The pipe coupling device recited in claim 13, wherein:
   the first collet portion includes a first splined inner surface portion and a first smooth inner surface portion; and
   the second collet portion includes a second splined inner surface portion and a second smooth inner surface portion.

15. A method of securing a first pipe to a second pipe within a pipe coupling device, comprising:
   providing a cylindrical collar having a central axis;
   providing a fastening mechanism;
   disposing a cylindrical collet concentrically within the collar and substantially aligned with the central axis, the collet comprising a first collet portion configured as an upper major arc having a transverse surface angularly offset from the central axis and a second collet portion configured as a lower minor arc having a complementary transverse surface angularly offset from the central axis that mates with the transverse surface of the first collet portion within the collar;
   applying at least one point force through the collar onto the first collet portion with the fastening mechanism; and
   compressing the first collet portion with the fastening mechanism against a second collet portion along the complementary transverse surface, thereby causing the first collet portion to translate in an angular direction along its transverse surface, until the first collet portion and the second collet portion securely clamp the pipes.

16. The method of securing recited in claim 15, wherein the first collet portion translates along a downward sloped transverse surface angularly offset from the central axis disposed along the axial length of the collar, and inward along an inwardly angled surface disposed on the complementary transverse surface of the second collet portion.

\* \* \* \* \*